Patented Jan. 15, 1952

2,582,411

UNITED STATES PATENT OFFICE 2,582,411

OLEFIN COPOLYMERS HAVING DRYING PROPERTIES

Herman S. Bloch, Chicago, and Alfred E. Hoffman, Clarendon Hills, Ill., assignors to Universal Oil Products Company, Chicago, Ill., a corporation of Delaware No Drawing. Application March 31, 1949, Serial No. 84,766

14 Claims. (Cl. 260—683.15)

This invention relates to a process for the production of relatively high molecular weight unsaturated hydrocarbon oils comprising a mixture of linear copolymers of a polyolefin and an iso-mono-olefin, the product thereof being especially suitable as a drying oil when exposed as a thin film to atmospheric oxygen. More specifically, the present invention concerns the manufacture of a synthetic hydrocarbon drying oil capable of producing a coating film having a remarkable degree of hardness, toughness and immunity to deterioration upon continued exposure to weathering conditions of sunlight, high and low temperatures and moisture, the process for the production of said drying oil involving copolymerization of a conjugated diene and a mono-iso-olefin at a relatively low temperature in the presence of a catalyst consisting essentially of anhydrous hydrogen fluoride in which reaction the several factors influencing the course of the polymerization are so correlated and controlled that a liquid product is obtained containing numerous unsaturated linkages in the structure of the hydrocarbon copolymers.

As provided herein, this invention concerns a process for the copolymerization of a conjugated diolefin with a mono-iso-olefin, each monomer containing not more than 8 carbon atoms per molecule, in the presence of hydrogen fluoride dissolved in the mixture of monomers, at temperatures below about −40° C. to about −80° C., characterized in that the weight proportion of diolefin to the combined weight of di- and mono-iso-olefin of from about 60 to about 95%, and preferably from about 75 to about 90 percent is utilized to obtain a distinctive, highly unsaturated copolymer product. At these reaction conditions, the product is a liquid copolymer having a molecular weight of from about 500 to about 5000, containing from about 10 to about 100 olefinic double bonds per molecule. The joint effect of the above selected conditions, especially the decisive factor of diolefin to mono-olefin ratios and the rigid control of the temperature of the reaction mixture, is the formation of a liquid copolymer of intermediate molecular weight rather than a solid copolymer having a molecular weight greater than about 5000 or a conjunct copolymer having less desirable film-forming properties. The rigid control of temperature during the formation of the copolymer and the generally high molar ratios of diolefin to iso-mono-olefin are considered to be critical factors in obtaining the desired and preferred liquid product, as these factors are believed to determine the manner in which the monomers condense to form the copolymer product. The fundamentally different reaction mechanism involved in the formation of an insoluble solid copolymer product as distinguished from the liquid product herein obtained is based upon the fact that copolymerization at the conditions specified in the present process is believed to proceed linearly by the addition of a monomer at the end of a copolymer chain during the copolymerization reaction, while in the case of the process in which the insoluble solid polymers are obtained (that is, when utilizing higher molar ratios of diolefin to mono-olefin and/or higher reaction temperatures), a great deal of cross-polymerization is obtained between the copolymers formed in the initial stages of the reaction and the monomer molecules and/or between the initial copolymers. The temperature of the reaction mixture, particularly at the point of polymer formation, is a factor of especially decisive importance in limiting the molecular weight of the product to linear copolymers of intermediate size. The control of this vital factor is effected in the present process by conducting the reaction in the presence of an internal refrigerant which evaporates and absorbs (by virtue of such evaporation) the large quantity of heat liberated by the highly exothermic reaction at the point of polymer formation. An alternative arrangement for externally refrigerating the reaction mixture, accompanied by rapid and thorough mixing of the monomer charging stock at the point of introducing the hydrogen fluoride polymerization catalyst may likewise be employed, although the latter is not the generally preferred method of conducting the reaction, because of the much greater difficulty of maintaining the desired low temperatures at the centers of copolymerization within the reaction mixture. This problem is associated with the difficulty of maintaining sufficiently thorough mixing to disperse the catalyst and reactants throughout the entire mass of the reaction mixture and to obtain rapid and efficient heat transfer from the external refrigerant to the centers of the copolymerization whereby cross-polymerization and the resultant formation of insoluble solid polymers, as well as conjunct polymerization, may be prevented. The internal refrigerant utilized in the present process is desirably a solvent or a diluent for the reaction mixture and in thus acting as a dispersing agent of the monomer reactants, it further aids in control of the reaction temperature by concontrolling the rate of reaction and hence the rate of liberation of the exothermic heat of copolymerization.

The use of substantially anhydrous hydrogen fluoride as catalyst in the present copolymerization reaction provides special advantages in the recovery of the desired copolymer produce and in preventing undesirable deterioration of the product during the recovery operation. Thus, hydrogen fluoride may be recovered for reuse from the catalyst-copolymer complex without deleterious effect upon the hydrocarbon product by an inexpensive and simple method hereinafter described in detail. If Friedel-Crafts metal halide catalysts, such as aluminum chloride, for example, are used for the reaction, they must be separated from the reaction produces by washing with an active solvent, such as alcohol or water. In the case of water, the aqueous phase of the hydrolyzed reaction mixture contains chemically hydolyzed or hydrated aluminum chloride which cannot be readily treated to recover the anhydrous catalyst for recycling purposes. If alcohol is used, the catalyst is similarly solvated.

In accordance with one if its embodiments, the present invention comprises copolymerizing a conjugated diolefin containing not more than 8 carbon atoms per molecule with a mono-iso-olefin containing not more than 8 carbon atoms per molecule in the presence of substantially anhydrous hydrogen fluoride at a temperature of from about $-80°$ to about $-40°$ C., utilizing a weight proportion of diolefin to the combined weight of di- and mono-iso-olefin of from about 60 to about 95 percent, and preferably from about 75 to about 90 percent.

A more specific embodiment of the invention concerns a process for the production of an unsaturated hydrocarbon drying oil which comprises contacting a liquid propane solution of a mixture of butadiene-1,3 and isobutylene containing a weight proportion of diolefin to the combined weight of di- and mono-iso-olefin of from about 60 to about 95 percent, with gaseous anhydrous hydrogen fluoride admixed with gaseous nitrogen and bubbled into said mixture, to form thereby a mixture containing at least 5% by weight of hydrogen fluoride based on the combined weight of diolefin and mono-iso-olefin, while maintaining the temperature thereof at the boiling point of said propane, and separating from the reaction mixture a copolymer of said butadiene and said isobutylene.

Other embodiments of the invention relating to specific reactants, particularly preferred conditions of operation, special methods of recovering the copolymers from the reaction mixture, and other factors relating to the process herein provided will be described in greater detail in the following further description of the invention.

Suitable polyolefinic hydrocarbon reactants containing conjugated unsaturation utilizable in the present process include hydrocarbons of this class which contain not more than about 8 carbon atoms per molecule and preferably contain a terminal methylene group; that is, one of the olefinic bonds in the carbon atom chain of the polyolefin molecule is situated between the carbon atom at the end of the chain and the carbon atom immediately adjacent thereto, the alpha carbon atom. Of the polyolefinic hydrocarbons, the di-olefins are more readily available and the least costly of the polyenes; for this reason, the diolefins are generally preferred, although the trienes may also be utilized in the process with substantially similar results insofar as the quality and yield of produce are concerned. Typical conjugated diolefins containing not more than about 8 carbon atoms per molecule include such compounds as piperylene, butadiene-1,3, isoprene, hexadiene-1,3, 2-methyl-pentadiene-1,3, 4-methylpentadiene-1,3, 2,3-dimethylbutadiene-1,3, 3-methylhexadiene-1,3 and others of homologous and analagous series. Conjugated dienes which do not have terminal methylene groups, such as hexadiene-2,4, or heptadiene-2,4 may also be used, but they react somewhat more sluggishly than the above. Diolefinic hydrocarbons utilizable as charging stock herein may be formed for example, by the dehydrogenation of paraffins and/or olefins or by the dehydration of polyhydric alcohols of the corresponding number of carbon atoms. Those dienes having more than about 8 carbon atoms are generally not preferred in the present process because they are lower in reactivity than the smaller molecules and form polymers which dry upon exposure to atmospheric oxygen to form films having a lesser degree of hardness.

The mono-iso-olefinic hydrocarbon reactants utilized in the present process are selected from the class of hydrocarbons containing preferably not more than about 8 carbon atoms per molecule in order to obtain the desired reactivity and to form a product containing the desired properties. The desired unsaturated product would generally not be obtained were higher molecular weight mono-iso-olefins utilized from which copolymers would result having a relatively large proportion of carbon atoms in the chain saturated with hydrogen or alkyl radicals derived from the saturated portion of the mono-iso-olefin molecule charged to the reaction. Although isobutylene (2-methylpropene) is generally preferred as the mono-iso-olefin reactant utilizable in the present process because of its availability and because it is the lowest molecular weight member of the series, other homologous members of the series such as 2-methylbutene-1, 3-methylbutene-1, 2-ethylbutene-1, 2,3-dimethylbutene-1, 3-methylhexene-1, etc. may likewise be utilized as the mono-iso-olefin reactant. Although iso-olefins containing terminal methylene groups are preferred, those lacking such groups, such as, for example, 2-methylbutene-2 may also be used under conditions modified to compensate for their somewhat lesser reactivity. Furthermore, mixtures of the mono-iso-olefin and conjugated diolefin reactant may be employed, such as $C_4$–$C_6$ fraction of the products of a thermal cracking reaction employing petroleum as charging stock. Another suitable source of the mono-iso-olefin reactant is an appropriately boiling fraction or selected portion of propylene and butylene polymers or interpolymers, such as a hexene to octene fraction of a codimer gasoline product. Further, it is possible to use, instead of the iso-olefins themselves, the corresponding tert-alkylfluorides, which, in a hydrogen fluoride-containing system, are equivalent in reactivity to the iso-olefins themselves and may, in a sense, be considered iso-olefin donors.

As heretofore indicated, the proportion of conjugated polyolefin to mono-iso-olefin reaction mixture charged to the present process is a factor of vital importance in obtaining a soluble product capable of "drying" upon exposure thereof to atmospheric oxygen. As observations of the copolymerization reaction have indicated, the mixture of copolymerizable monomers in the reaction must contain at least 60 percent by weight of the diolefin, and preferably from about 75 to about 90 percent of the combined weight of di- and mono-iso-olefin, depending upon the amount of unsaturation desired in the ultimate product. When utilized in the above specified range of molar proportions, the monomers copolymerize to form liquid hydrocarbon oils having molecular weights of from about 500 to about 5000, containing from about 10 to about 100 olefinic double bonds per molecule, of which essentially none are conjugated with each other. If the diene to iso-olefin ratio is higher than the range indicated, insoluble solid polymers are formed, so that in a sense the addition of the iso-olefins may be said to permit the polymerization of the dienes under these conditions to useful drying oil products. On the other hand, a diene to iso-olefin ratio lower than the range cited results in lesser yields of products which are relatively poor in drying properties. A further essential factor in obtaining the desired linear polymerization rather than cross-polymerization so that a liquid, unsaturated hydrocarbon oil rather than a resinous or solid cross-polymer is formed, is the maintenance of the reaction temperature during the copolymerization reaction at a value at least below $-40°$ C., preferably from about $-60°$ to about $-80°$ C. At higher reaction temperatures, a significant proportion of the monomers copolymerize to form the solid insoluble cross co-polymers which may appear in admixture with the desired liquid copolymer, or the entire product may be of the solid variety, depending upon the reaction temperature. The tendency to form the solid copolymers increases as the reaction temperature increases, until such point where true copolymerization ceases and undesirable conjunct polymerization begins. In order to maintain strict control of the temperature within the limits specified, and also to eliminate the formation of any significant proportion of the insoluble solid copolymer product, a means for providing efficient transfer of the exothermic heat of reaction from the centers of polymerization (generally, the immediate region surrounding or in contact with the catalyst) is provided in the present process. One of the most desirable methods of obtaining the efficient removal of heat from the reaction mixture comprises conducting the copolymerization reaction in the presence of a low boiling solvent for the hydrocarbon monomers having a boiling point within the preferred range of reaction temperatures. Solvents which thus act as internal refrigerants and as diluents of the reacting monomers include such compounds as the low molecular weight paraffins, such as liquefied propane and butane, the low molecular weight alkyl halides such as methylchloride, methylbromide, ethylchloride, ethylbromide, etc., and the fluorocarbons, such as perfluoroethane, perfluoropropane and perfluorobutane. Refrigerants which however do not act as diluents may also be employed, such as solid carbon dioxide (Dry Ice) when introduced directly into the reaction mixture and allowed to vaporize as the reaction temperature tends to exceed the freezing or boiling points of the refrigerant. Temperature control of the copolymerization reaction may also be obtained by providing an externally refrigerated reactor vessel in which the reaction mixture may be vigorously stirred to maintain the efficient transfer of heat from the reaction mixture to the external refrigerant. The latter arrangement is, however, least preferred because of the generally less efficient heat transfer obtained thereby.

The copolymerization of the mono-iso-olefin and polyolefin reactant herein provided is effected in the presence of a catalyst consisting essentially of substantially anhydrous hydrogen fluoride containing less than about 10% by weight thereof of water. The catalyst is introduced gradually into the reaction mixture containing the polyolefin and iso-mono-olefinic hydrocarbon reactants and/or diluent-refrigerant and preferably in small quantities as the reaction proceeds. For this purpose, the hydrogen fluoride is desirably added to the mixture of reactants in gaseous form, preferably bubbled into the mixture as a suspension or mixture with an inert diluent gas such as nitrogen or gaseous hydrocarbons. The reaction mixture at the point of inlet of the hydrogen fluoride vapors is thoroughly agitated to obtain uniform distribution of the hydrogen fluoride throughout the mixture of reactants contacted, the total quantity of hydrogen fluoride introduced into the mixture being from about 5% to about 25% of the combined weight of mono-iso-olefin and polyolefin reactants. Below about 10% by weight of the reactants, the quantity of hydrogen fluoride is generally insufficient to convert in adequate yield the monomers charged to the process to copolymers thereof. Above about 25% by weight of the combined monomers, the additional quantity of hydrogen fluoride effects no useful purpose in completing or extending the copolymerization reaction.

Following completion of the desired degree of copolymerization after the addition of from about 5% to about 25% by weight of the combined reactants of hydrogen fluoride to the reaction mixture, the hydrocarbon must be separated from the catalyst. The catalyst may be removed from the mixture by the addition of water, aqueous hydrogen fluoride, or aqueous solutions of sodium hydroxide, potassium hydroxide, ammonia, etc., after which the aqueous phase is separated from the copolymer. While such a procedure is often convenient and produces a satisfactory hydrocarbon product, the catalyst is not recovered in condition for reuse, except in the case of aqueous hydrogen fluoride, from which the anhydrous acid may be distilled in part. Other methods of catalyst removal which circumvent this difficulty will be subsequently described in greater detail. Certain oxygen-containing compounds such as alcohols, esters, ethers, phenols, etc. combine with the hydrogen fluoride to form complexes and free the copolymer product. In a similar manner, certain inorganic salts such as sodium fluoride, potassium fluoride, lithium fluoride, and others combine with hydrogen fluoride to form double salts; anhydrous ammonia and the amines, and alkanol amines, which form amine hydrofluoride salts by reaction with the hydrogen fluoride in the reaction mixture, particularly the high boiling amines such as aniline, pyridine, quinoline, decylamine and their homologs, the hydrogen fluoride salts of which may be heated to recover not only the organic amine for recycle purposes, but the hydrogen fluoride as well in an anhydrous state for recycle to the polymerization stage of the process.

The above materials which combine with hydrogen fluoride and release the copolymer oils therefrom may be designated collectively as "bases," where the term "base" as utilized herein characterizes a class of materials having the general properties of being capable of combining with an acid to form a complex therewith or a neutral salt thereof.

In order to premote the separation between the copolymer product and other components of the reaction mixture, particularly the product formed by reaction of the base with the hydrogen fluoride catalyst, a low boiling naphtha diluent or other mixture of hydrocarbons containing a large percentage of aromatic hydrocarbons such as benzene, toluene, xylene, etc., may be added to the reaction mixture following the addition of the base, the copolymer product dissolving in the naphtha solvent or other aromatic hydrocarbon solvent to form a separate phase which may be decanted from the remaining reaction mixture. In some cases, especially when a low boiling paraffin hydrocarbon such as propane or butane is utilized as the internal refrigerant during the copolymerization reaction, the separation takes place after the addition of the base without the necessity of adding an additional solvent to effect separation of the product from the remaining components of the reaction mixture.

In accordance with a further alternative method of recovering the hydrogen fluoride catalyst from the copolymerization reaction mixture and simultaneously effecting the recovery of the copolymer product, the reaction mixture obtained upon completion of the copolymerization reaction may be heated or otherwise distilled to vaporize the hydrogen fluoride from the other components of the reaction mixture. The distillation is preferably effected rapidly, for example, by flash distillation of the mixture into a distillation apparatus at normal or sub-atmospheric pressure. Further, this distillation may be carried out more efficiently in the presence of a decomposition catalyst selected from such metals and their alloys as copper, cobalt, nickel, lead, tin, and silver. The hydrogen fluoride may also be flashed therefrom by introducing the copolymerization reaction mixture into a low boiling hydrocarbon naphtha maintained at a temperature of from about 50° to about 150° C. and permitting the hydrogen fluoride to flash distill from the mixture. The copolymer product is thereafter recovered from its solution with the naphtha diluent and/or internal refrigerant by a low temperature distillation procedure which may be effected at sub-atmospheric pressures in order to lower the temperature and thereby prevent deterioration by further polymerization of the copolymer product. The mixture, prior to distillation, may be washed successively with several portions of water or dilute caustic to remove any residual hydrogen fluoride which would adversely affect the product during the distillation.

The copolymer product as recovered in accordance with the above procedure is a light-colored (almost colorless) viscous, highly unsaturated hydrocarbon oil containing from about 10 to about 100 non-conjugated olefinic double bonds per molecule and having molecular weights above about 500 to about 5000. It dries rapidly, especially in the presence of metallic driers such as cobalt naphthenate, cobalt oleate and other well-known drier salts, particularly those of lead and manganese, upon exposure in thin films to atmospheric oxygen. The mechanism of the drying reaction in the case of the present copolymer hydrocarbons is believed to be one of polymerization and oxidation as a result of numerous functional unsaturated bonds contained in the structure of the copolymer molecule. When subjected to oxidative drying, a film of the copolymer oil becomes tack-free in less than about 8 hours and dries to a completely non-tacky film in less than about 24 hours to form a film of extreme hardness (having Sward hardness values of about 50) which are also tough, and highly resistant to abrasion. The dried films thereby obtained are moisture and alkali resistant, and do not discolor upon exposure to ultra-violet radiation. The desirable drying characteristics of the copolymer product of this invention renders the same particularly useful in the formulation of protective and decorative coatings such as paints, varnishes, lacquers, etc., as a component in the formulation of printing ink compositions of the oxidative drying type, and its highly unsaturated structure enables it to undergo reaction with sulfur, sulfur halides and thiuram compounds to form factices thereof. Its highly unsaturated structure also enables the product to undergo addition and copolymerization reactions with other unsaturated compounds such as unsaturated fatty acid glycerides, alkenyl halides, allyl esters, vinyl esters, vinyl aromatics, acrylates, maleic acid derivatives, and the like, to form resinous or plastic derivative products thereof.

The present invention will be further explained with reference to the following illustrative examples in which specific reactants and procedures will be described in accordance with particular embodiments of the invention. In thus describing the invention with reference to specific factors involved in the process, it is not thereby intended to limit the generally broad scope of the invention in strict accordance thereto.

*Example I*

A hydrocarbon drying oil copolymer of butadiene and isobutylene was prepared in the following experiment utilizing hydrogen fluoride vapor as the catalyst. 56.7 grams of butadiene and 9.80 grams of isobutylene, forming a mixture containing molar ratio of butadiene to isobutylene of 6.0, was dissolved in 120 grams of liquid propane maintained in liquid phase by the addition of Dry Ice to the above reactants, and 12 grams of hydrogen fluoride vapor were gradually added to the reactants as the latter were vigorously stirred. The hydrogen fluoride vapor was introduced into the reaction mixture immediately above the surface of the stirred mixture and was allowed to enter the liquid phase by absorption through the surface. Additional Dry Ice was added to the reaction mixture as the exothermic heat of the resulting copolymerization reaction vaporized the carbon dioxide, thus maintaining the reaction temperature at approximately −76 C. throughout the reaction. The mixture was stirred an additional 3 hours at the above temperature and the reaction then terminated by the addition of dilute aqueous sodium hydroxide to the mixture. Benzene was then introduced into the reaction to form a two-phase mixture from which the upper, benzene-containing phase was decanted from the lower aqueous phase. Benzene was distilled from the mixture, leaving a viscous, water-white liquid having an apparent bromine number of approximately 101 and an approximate molecular weight of 630. The yield of residue comprising the copolymer drying oil was 22.0 grams. The oil, when spread as a thin film and exposed to atmospheric oxygen, dried to a tack-free film in less than 24 hours and the dried film had a Sward hardness of approximately 47. When the film was baked at 110° C. for 8 hours or exposed to an accelerated Weatherometer test, it did not yellow or otherwise discolor during the test.

*Example II*

A mixture of 100 grams of propane, 29.1 grams of isobutylene and 177 grams of butadiene was introduced into a copper vessel containing Dry Ice refrigerant. The mixture was vigorously stirred and maintained at a temperature of approximately −75° C., as 13 grams of hydrogen fluoride vapor mixed with nitrogen was carried into the reaction mixture over a reaction period of approximately 4 hours. Following the above reaction, 50 grams of ethyl alcohol was added to the stirred reaction mixture, and 100 grams of benzene added thereto which caused the formation of a two-phase reaction mixture. The two phases were separated by decantation, and the benzene-containing phase distilled to remove the benzene therefrom. 60 grams of a liquid, viscous oil was recovered as a residue comprising the copolymer of the butadiene and isobutylene. The recovered product had an apparent bromine number of approximately 74 and a cryoscopic molecular weight of approximately 950. Quantitative catalytic hydrogenation indicated that this material contained one double bond per 4.6 carbon atoms. When spread as a thin film on a test panel and exposed to atmospheric oxidation, it dried to a completely tack-free film in less than 48 hours.

*Example III*

A polymer-hydrogen fluoride mixture prepared as in Example II, except that 50 g. of hydrogen fluoride was used, was passed through a brass-packed tower maintained at 95° C. at atmospheric pressure. Substantially all of the hydrogen fluoride was recovered overhead, together with the propane and small amounts of unreacted olefinic gases. The drying oil was recovered from the bottom of the tower as a product having properties similar to those of the product of Example II except that the color was slightly darker.

We claim as our invention:

1. A process for the preparation of a light-stable, liquid hydrocarbon drying oil which comprises copolymerizing a conjugated polyolefin having not more than 8 carbon atoms per molecule and an iso-mono-olefin containing not more than 8 carbon atoms per molecule employing a weight proportion of diolefin to the combined weight of di- and mono-olefin of from about 60 to about 95 percent in the presence of substantially anhydrous hydrogen fluoride as catalyst and at a temperature of from about −80° to about −40° C.

2. The process of claim 1 further characterized in that the olefinic unsaturation of said mono-iso-olefin is on a terminal carbon atom.

3. The process of claim 1 further characterized in that said mono-iso-olefin is isobutylene.

4. The process of claim 1 further characterized in that said conjugated polyolefin is butadiene-1,3.

5. The process of claim 1 further characterized in that said hydrogen fluoride is present in an amount of from about 5% to about 25% of the combined weight of iso-mono-olefin and polyolefin.

6. A process for the preparation of a light-stable, liquid hydrocarbon drying oil which comprises contacting substantially anhydrous hydrogen fluoride at a temperature of from about −80° to about −40° C. with a mixture containing from about 60 to about 95 weight percent of a conjugated diolefin having not more than 8 carbon atoms per molecule and from about 5 to about 40 weight percent of iso-mono-olefin having not more than 8 carbon atoms per molecule in the presence of an inert refrigerant to form thereby a mixture containing from about 5% to about 25% by weight of hydrogen fluoride per unit weight of combined diolefin and mono-iso-olefin.

7. The process of claim 6 further characterized in that said inert refrigerant is propane.

8. The process of claim 6 further characterized in that the mixture containing said diolefin and said mono-iso-olefin is contacted with hydrogen fluoride introduced as a vapor.

9. A process for the preparation of a light-stable, liquid hydrocarbon drying oil which comprises contacting substantially anhydrous hydrogen fluoride at a temperature of from about −80° to about −40° C. with a mixture containing from about 60 to about 95 weight percent of a conjugated diolefin having not more than 8 carbon atoms per molecule and from about 5 to about 40 weight percent of an iso-mono-olefin having not more than 8 carbon atoms per molecule in the presence of an inert diluent of said hydrocarbon having a boiling point below about 0° C. to form thereby a mixture containing from about 5% to about 25% by weight of hydrogen fluoride per unit weight of combined diolefin and mono-iso-olefin and separating the reaction mixture by flash distillation.

10. The process of claim 9 further characterized in that said flash distillation is effected in the presence of a decomposition actalyst comprising a metal selected from the group consisting of brass, copper, tin, cobalt, and nickel.

11. A process for the preparation of a light-stable, liquid hydrocarbon drying oil which comprises contacting substantially anhydrous hydrogen fluoride at a temperature of from about −80° to about −40° C. with a mixture containing from about 60 to about 95 weight percent of a conjugated diolefin having not more than 8 carbon atoms per molecule and from about 5 to about 40 weight percent of an iso-mono-olefin having not more than 8 carbon atoms per molecule to form thereby a mixture containing from about 5% to about 25% by weight of hydrogen fluoride per unit weight of diolefin and mono-iso-olefin, adding a base to the resulting reaction mixture in an amount sufficient to combine with said hydrogen fluoride and separating the resulting copolymer drying oil from the reaction mixture.

12. A process for the preparation of a light-stable, liquid hydrocarbon drying oil which comprises contacting substantially anhydrous hydrogen fluoride at a temperature of from about −80° to about −40° C. with a mixture containing from about 60 to about 95 weight percent of a conjugated diolefin having not more than 8 carbon atoms per molecule and from about 5 to about 40 weight percent of an iso-mono-olefin having not more than 8 carbon atoms per molecule to form thereby a mixture containing from about 5% to about 25% by weight of hydrogen fluoride, thereafter adding an aromatic hydrocarbon to the reaction mixture and separating the resulting aromatic hydrocarbon-copolymer phase from the reaction mixture.

13. The process of claim 11 further characterized in that said base is an alkali metal fluoride salt.

14. The process of claim 11 further characterized in that said base is an amine.

HERMAN S. BLOCH.
ALFRED E. HOFFMAN.

REFERENCES CITED

The following references are of record in the file of this patent:

UNITED STATES PATENTS

| Number | Name | Date |
|---|---|---|
| 2,092,889 | Mikeska et al. | Sept. 14, 1937 |
| 2,301,668 | Pier et al. | Nov. 10, 1942 |
| 2,404,220 | D'Alelio | July 16, 1946 |
| 2,442,643 | Elwell et al. | June 1, 1948 |
| 2,442,644 | Elwell et al. | June 1, 1948 |
| 2,470,894 | Johnstone | May 24, 1949 |
| 2,474,881 | Young et al. | July 5, 1949 |